United States Patent [19]

Pann

[11] Patent Number: 4,887,243

[45] Date of Patent: Dec. 12, 1989

[54] REMOVAL OF SURFACE MULTIPLES

[75] Inventor: Keh Pann, Richardson, Tex.

[73] Assignee: Mobil Oil Corporation, New York, N.Y.

[21] Appl. No.: 452,996

[22] Filed: Dec. 27, 1982

[51] Int. Cl.$^4$ ............................................. G01V 1/38
[52] U.S. Cl. ....................................... 367/24; 367/73
[58] Field of Search ....................... 367/24, 21, 40, 51, 367/27, 38, 43, 73, 42, 59; 364/421; 181/108, 111, 112; 346/33 C

[56] References Cited

U.S. PATENT DOCUMENTS

| | | | |
|---|---|---|---|
| 3,339,176 | 8/1967 | Sparks | 346/33 C |
| 3,344,395 | 9/1967 | Silverman et al. | 346/33 C |
| 3,371,310 | 2/1968 | Silverman | 367/59 |
| 3,381,266 | 4/1968 | Harris | 367/59 |
| 3,421,140 | 1/1969 | Kerns | 367/43 |
| 3,581,274 | 5/1971 | Ruehle | 367/43 |
| 3,599,175 | 8/1971 | Hollingsworth et al. | 367/42 |

FOREIGN PATENT DOCUMENTS 1195204  6/1970  United Kingdom ................. 367/59

OTHER PUBLICATIONS

Brewer, Richard, "How Horizontal Stacking Has Affected the Oil Industry," World Oil, Oct. 1967, pp. 137-149.

Attenuate Multiples, Advanced Geophysical Service Technology.

*Primary Examiner*—Thomas H. Tarcza
*Assistant Examiner*—Ian J. Lobo
*Attorney, Agent, or Firm*—Alexander J. McKillop; Charles J. Speciale

[57] ABSTRACT

A method of removing multiple surface reflection events from seismic data is disclosed. Pairs of real seismic traces having end points in common with a trace being analyzed are convolved with one another to yield synthetic multiple traces having real components. All possible combinations of real traces are thus convolved. These are then stacked to yield the synthetic multiple trace having the shortest total travel time, which is the synthetic multiple trace corresponding to the actual multiple reflection event recorded as part of the real trace being analyzed. The stacked synthetic multiple trace can then be subtracted from the real trace under analysis to yield a multiple-free seismic record for further processing.

15 Claims, 5 Drawing Sheets

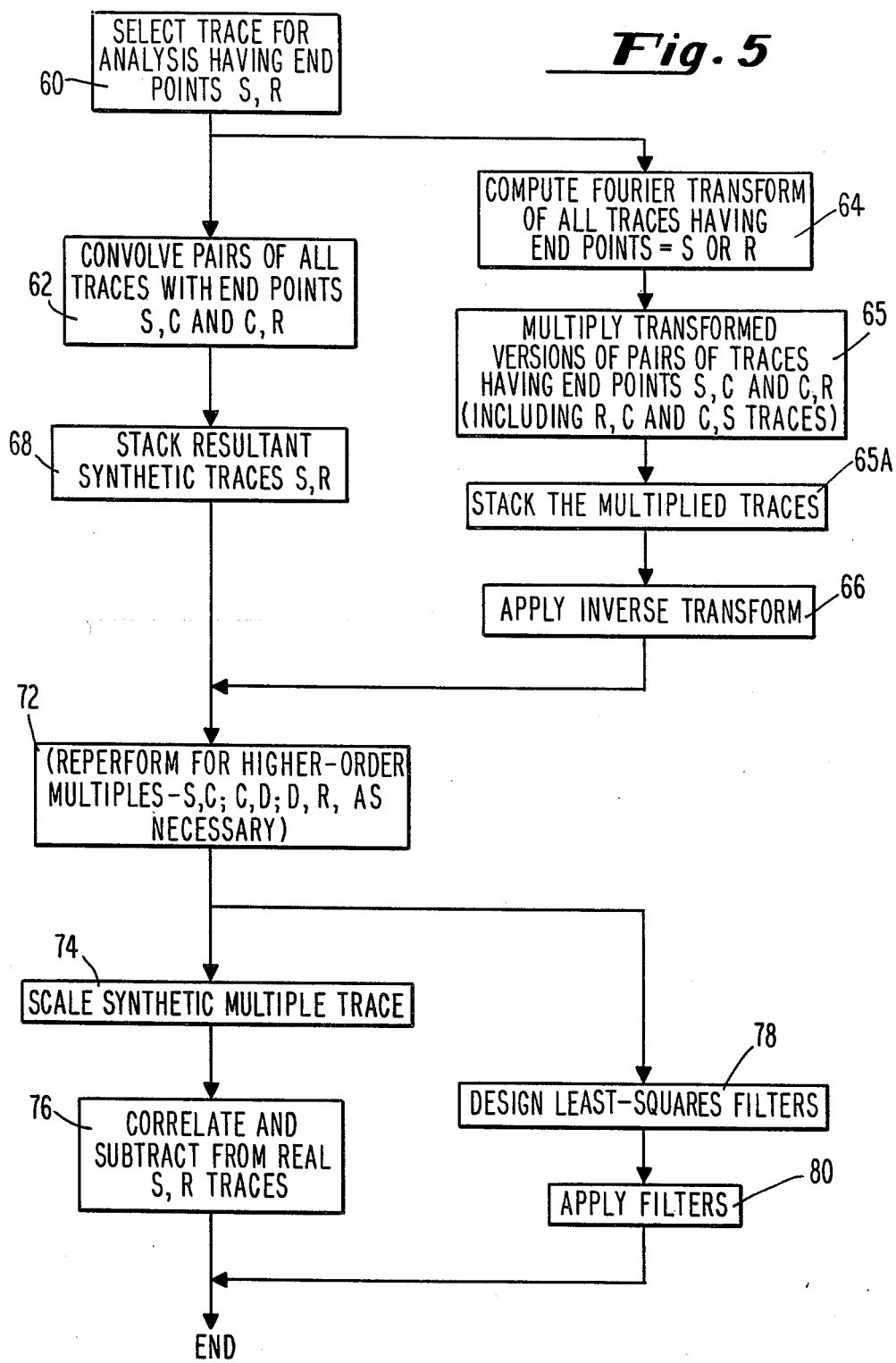

REMOVAL OF SURFACE MULTIPLES

FIELD OF THE INVENTION

This invention relates to the field of seismic data processing. More particularly, this invention relates to a method of removing unwanted multiple reflection events which obscure true seismic events in seismic exploration records.

BACKGROUND OF THE INVENTION

A common practice in the exploration for oil, gas and other valuable minerals is to perform seismic exploration in which an acoustic wave is imparted to the earth (including the sea) at or near the surface. The wave travels into the earth and reflects at boundaries between layers of materials of differing acoustic impedance. The reflected waves travel upwardly and may be detected at or near the surface by pluralities of microphones. The signals output by the microphones can be analyzed to determine the time of travel of the acoustic wave from the source to the microphone, and used to generate a representation of the earth's subterranean structure. The recorded signal, referred to as a seismic "trace", can be interpreted by skilled persons to identify likely locations for deposits of oil, gas and other valuable minerals.

One problem which has plagued this seismic exploration art since its inception is the fact that the acoustic waves travel in all directions in the earth, resulting in numerous reflections being recorded. For example, in the ocean exploration case, the wave may travel first downwardly towards the ocean bottom, up again towards the surface, be reflected back down towards the bottom and reflected again before being received at a microphone or "hydrophone." Such a wave is called a "surface multiple" because it reaches the surface twice in its path from the source to the receiver. Surface multiples also occur when the wave travels first into the sea bed, reflects from an interface between rock layers of varying acoustic impedance, travels back upwardly to the surface, back downwardly to the sea bottom or again to an interface between rock layers of varying impedance, and only then up to the source. This too is referred to as a surface multiple. Multiples also occur where the wave is reflected within a given rock layer a plurality of times before being received at the surface. These multiples, however, are not considered surface multiples. It is found, however, that the surface multiples constitute most of the multiples which obscure true seismic events in the recorded hydrophone output signal, or "trace." Multiples can thus be considered as unwanted "noise" in the seismic record, since they obscure the seismic events of interest. Accordingly, it has for a long time been a well recognized need of the art to provide an effective method for removing surface multiples from the seismic record.

Various prior art methods have been tried for removal of surface multiples from recorded traces. It has been noted, for example, that the travel time for a surface multiple, the path of which is entirely in the water during an oceanographic expedition, is a function of the "offset", the distance between the source and receiver, and the number of times the multiple reflects from the surface. For example, if the multiple reflects from the surface once before being received by the microphone and the offset is zero, the multiple's travel time is exactly twice that of the principal waves. This fact has been used in various schemes to remove multiples.

Other methods involve complex ray tracing schemes which generate a synthetic multiple wave and subtract it from the actual wave to obtain a supposedly multiple free record. However, these methods are very awkward in that they require significant knowledge of the subsea structure as well as the ocean bottom configuration before the synthetic wave can be generated. Similar synthetic multiples can be generated using more accurate methods not directly involving ray tracing, e.g., field propagation techniques, but again these require detailed knowledge of at least the ocean bottom, as well as the shape of the subsea interfaces, and so are not as practical as would be desired.

OBJECTS OF THE INVENTION

Accordingly, it is an object of the invention to provide an improved method for removing the record of multiple surface reflection events from seismic records for data processing purposes.

Another object of the invention is to provide a method of removing surface multiples from seismic records which does not require any knowledge of the ocean bottom structure, nor of the structure of the interfaces separating various layers forming the sea bed.

Another object of the invention is to provide an improved seismic data gathering technique.

The ultimate object of the invention is to provide an improved method of seismic exploration for oil, gas and other valuable minerals which yields seismic records which can be more reliably interpreted.

SUMMARY OF THE INVENTION

The above needs of the art and objects of the invention are satisfied by the present invention which comprises a method for removing surface multiple reflections from seismic records made during seismic exploration of the seabed. Synthetic multiple traces are generated by combining pairs of real traces, which pairs have one end point in common and their others identical to the source and receiver locations of the trace of interest. The combination step is performed by convolution of the paired traces, as well understood in the art. All possible pairs of multiples which thus "add up" to the trace of interest are examined according to Huygens' Principle, stating that the one of a plurality of possible waves which takes the shortest travel time in any real system is that which actually occurs. Accordingly, the combined pair of real traces with the wave which has the shortest total travel time is equivalent to the wave path actually taken by the multiple. In a preferred embodiment, the synthetic traces are "stacked" to generate a minimum travel time synthetic trace. The synthetic multiple trace thus generated can be subtracted from the trace under analysis to yield a multiple-free trace.

BRIEF DESCRIPTION OF THE DRAWINGS

The invention will be better understood if reference is made to the accompanying drawings, in which:

FIG. 5 is a flowchart of the method of the invention.

DESCRIPTION OF THE PREFERRED EMBODIMENTS

Figure 1:
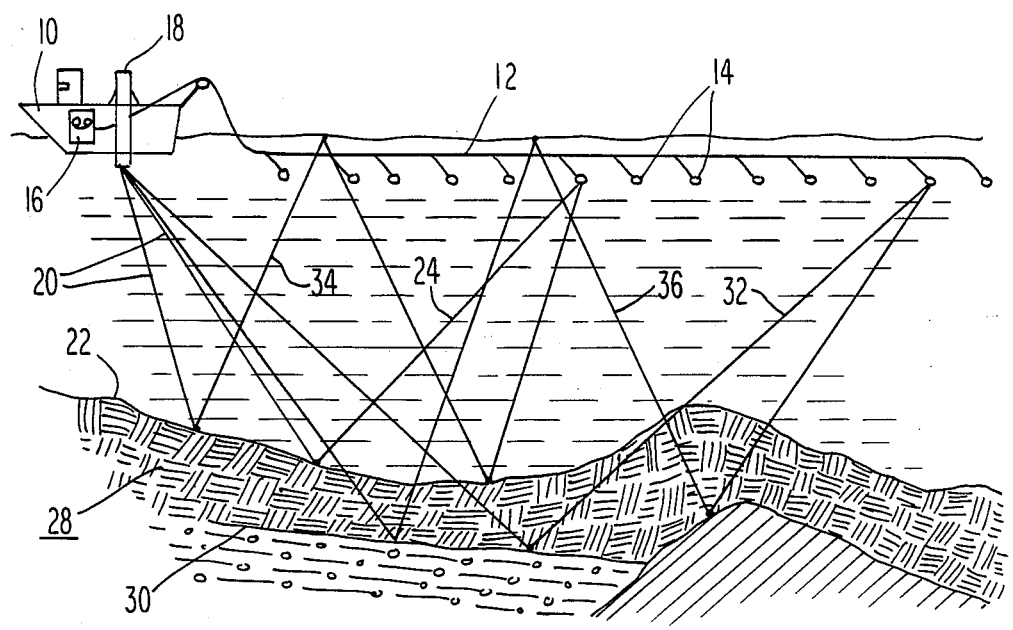
FIG. 1 represents a pictorial view of ocean-going seismic exploration.

FIG. 1 shows a typical ocean-going seismic exploration system. An exploration vessel 10 tows a "streamer" cable 12 which comprises many hydrophones 14 which are microphones adapted to receive acoustic waves in water, typically of frequencies from 0 to 100 Hz. The signals from the receivers may be transmitted up the streamer cable to the vessel 10 for recording on recording device 16, all as well understood in the prior art. The vessel 10 also carries means for emitting an acoustic wave into the water such as a compressed air gun as indicated at 18. The wave travels downwardly along a plurality of paths 20 and is reflected from the interfaces between materials of varying acoustic impedence such as the ocean bottom 22, and is reflected back upwardly as along path 24 to be picked up by the hydrophones 14. The wave also travels into the subsea bed as at 28, is reflected at the interface 30 between bed 28 and that beneath, and travels upwardly to be received at a differing hydrophone along a path 32. The wave paths shown at 24 and 32 are referred to as direct or primary waves, since the path includes only one reflection from an interface within the ocean or the sea bed before detection by a hydrophone. "Multiples" are also shown in FIG. 1 at 34 and 36. These are ray paths according to which the wave reaches the surface more than once. As discussed above, such multiples are a source of much aggravation in seismic data processing because they obscure actual seismic events which happen to take place at a time comparable to that taken by the multiply-reflected wave to reach the same hydrophone and are a source of spurious data. Accordingly, it is desirable that a method for removal of the records of multiple seismic events from seismic records be provided, and such is the chief goal of this invention.

It will be understood by those skilled in the art that in general ocean-going seismic exploration is performed by a ship towing a streamer containing many hydrophones, for example 200 and up, along a straight line. A "shot" is generated at regular intervals, typically 8-10 seconds, and the signal output by each hydrophone is separately recorded. When graphed, such signals are referred to as traces. Accordingly, along the line of exploration the shot points and hydrophone locations are such that very complete coverage of the line is obtained and a shot and a receiver will at some time have been positioned at almost all respective points along the line. The present invention makes use of this fact.

Figure 2:
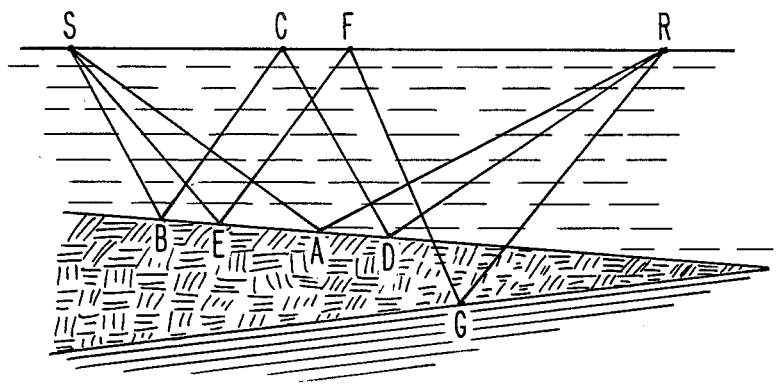
FIG. 2 represents a schematic view of various possible paths taken by seismic waves from a source or receiver.

It is assumed for the purposes of this invention that the net output of any given hydrophone, a "trace", is the record of the various primary reflections of the wave from the ocean bottom and the interfaces between the varying rock layers making up the subsea floor and of the multiples. Accordingly, if the multiples can be synthesized by the method of the invention, they can be directly subtracted from a trace of interest, yielding a trace which contains only primary reflections, which are those of interest to persons examining the seismic record for evidence of oil, gas or other valuable minerals. The invention further assumes that the multiples as shown in FIG. 1 can be treated as sums of primary reflections. Accordingly, the wave path taken by a first order multiple, one in which the wave reflects from the water surface once before arrival at a hydrophone, is equal to the sum of two primary ray paths, one having the same source location and another having the same receiver location as the wave being analyzed in this fashion, with their other end points in common, at the location of the multiple's reflection from the surface. This will be explained in connection with FIG. 2. For example, consider the case of a wave passing from a source location S to a hydrophone location R along the path SAR. This is a primary wave. A multiple also reaches R from S by passing along the path SB—B—C—CD—DR. The invention assumes that this multiple, referred to as "SBCDR" can be modeled by combining the pair of primary waves SB—BC and CD—DR. These will have been recorded during the conventional exploration process. Similarly, the multiple SEFGR, in which one of the reflections is from a subsea bed, and one from the ocean bottom, can be synthesized from the combination of primaries SEF and FGR. Accordingly, in order to subtract the multiples having reflections at C and F from the trace SR recorded with the shot point at S and the hydrophone at R, it is only necessary to locate points C and F and to combine the trace recorded with respect to ray path SBC with that corresponding to CDR and similarly combine traces SEF and FGR and subtract the combined, "synthetic" traces from trace SR, having the ray path SAR.

Figure 3:
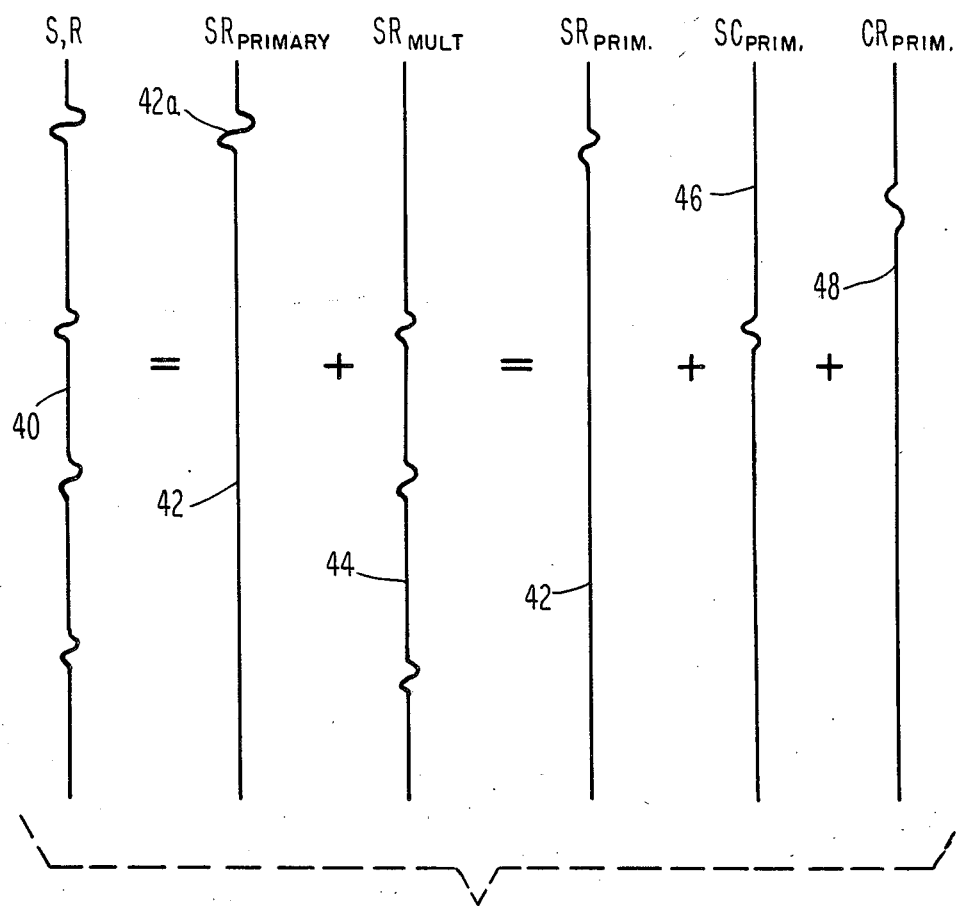
FIGS. 3 and 4 are diagrams showing schematic traces useful in understanding the invention.

FIG. 3 shows in schematic form individual seismic "traces" which are useful in understanding this aspect of the invention. Trace 40 in FIG. 3 is an idealized version of the analog representation of the trace recorded with respect to source location S and receiver location R. The amplitude of the signal is in the left-right direction of the diagram, and time proceeds from top to bottom, as is conventional. Such traces are stored in computer memory as a sequence of digital "words" each representing the analog amplitude of the trace at a given point in time. The representations thereof shown in FIG. 3 (and FIG. 4) thus correspond to graphic representations of these sequences of digital words. Such traces are commonly output for analysis by trained personnel.

The present invention presupposes that the wave recorded as trace SR is the sum of a primary wave and one or more multiple waves. The primary reflection of the wave recorded by trace 42 is shown at 42a on the trace. It corresponds to the direct path taken by the acoustic wave input to the earth and received at a receiver after a single reflection from an interface between materials of various acoustic impedances. Only a single ripple 42a indicating detection of the primary reflection is shown. It will be appreciated that typically such traces record numerous such primary reflections corresponding to the number of interfaces at which reflection of the primary wave occurs. However, for the purposes of understanding the invention, only a single primary reflection need be considered. The remainder of the reflections recorded by trace 40 are multiples which are shown separately on trace 44; that is, the assumption is made that the trace 40 shows the sum of the primary reflection on trace 42, and of the multiples on trace 44. The assumption is then made that the reflections on multiple trace 44 are effectively the sum of two primary reflections which are shown on traces 46 and 48, these being the traces recorded with respect to waves between the source S and the location C at the surface of the sea at which the multiple reflection takes place, and between point C and the receiver location R. Accordingly, the overall received trace 40 is equal to the sum of the trace 42 plus the sum of two traces occurring between point C on the surface and the source and receiver locations S and R, respectively. These real traces (which will be referred to hereafter as SC and CR) will have typically been recorded in the course of the exploration operation, i.e., CR when the vessel is at C and SC in connection with the same "shot" as the wave SR under analysis. The difficulty is in accurate location of the point C at the surface from which the multiple reflection occurs. However, while point C can be located according to the present invention it need not be in order to remove multiples from a seismic record.

The selection of the points C and F, the points at which various multiples are reflected from the surface, can be determined using ray tracing techniques if the exact configuration of the ocean bottom and of the subsea beds are known and if the velocity of the sound wave in these media is known. Unfortunately, such knowledge is not easy to acquire and indeed with respect to the configuration of the subsea bed is originally the object of seismic exploration. Accordingly, prior art methods involving ray tracing to calculate multiples in this fashion have been, at best, marginally successful and in any case have consumed large amounts of computer time for the iterative methods used in ray tracing.

The present application utilizes Huygens' Principle of Wave Propagation, which states that a wave traveling in any medium or combination of media between two fixed points will take that path which yields the shortest possible total travel time. This physical principle is coextensive with Snell's Law, which is used in ray tracing. However, it simplifies matters in cases where the precise configuration of the various interfaces between the media are not known, as here. Instead, all possible pairs of primary ray paths can be combined and the travel time measured for each. That pair of real ray paths which has the shortest travel time will be that along which the multiple actually travels.

It will be appreciated that this method provides the actual multiple path taken regardless of the shape of the ocean bottom and of the interfaces between the subsea beds, because these control the real multiple and the individual primary reflections which are summed to generate the synthetic multiple in an identical way.

In carrying out the process of the present invention, the actual path undergone by a multiple from a source location S to a receiver location R is determined by combining pairs of traces having a common beginning and ending point in the interval between S and R. (In this specification, the term "combining" pairs of waves to form a synthetic trace means convolution or a similar mathematically appropriate procedure.) If all possible pairs of traces combined in this region, that convolved pair with a reflection having the shortest total travel time has the same path as the multiple between S and R. Accordingly, in order to determine the actual multiple path between S and R, one combines pairs of traces, in which one of each pair is recorded with respect to a source at some point C in the interval between S and R and a hydrophone at point R, and the other is recorded with respect to a source at S and a hydrophone at the same point C, and determines which of all these combined traces has the minimum total travel time.

Present day exploration practices involve the generation and recording of all these traces. Accordingly, the method of the invention does not involve any additional data gathering requirements.

Figure 2A:
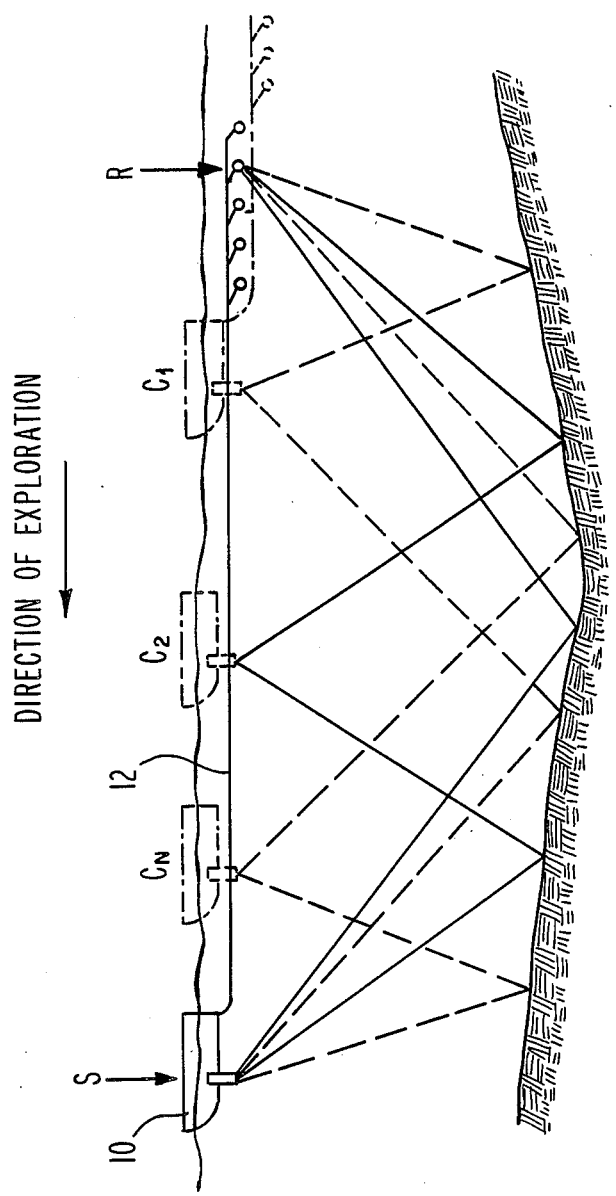
FIG. 2A details the typical sequence of exploration operations.

FIG. 2A shows how the pairs of traces which can be combined to generate a synthetic multiple trace are generated. An exploration vessel 10 is shown at four successive locations in a direction of exploration $C_1$, $C_2$, $C_N$ and S. This is in accordance with the practice according to which the vessel steams in a generally straight line, emits an acoustic wave into the water at on the order of 10 second intervals and trails behind it a long streamer 12 containing many hydrophones adapted to output traces with respect to a like number of locations along its length. Assume that it is desired to remove multiples from the trace recorded with the vessel 10 at a source location S and a hydrophone at a location R along its streamer 12. In order to do so, synthetic multiple traces corresponding to all possible real multiple ray paths are generated. Several possible multiple paths are shown in FIG. 2A. These may be simulated by generation of synthetic multiple traces by combining real traces which were recorded with the exploration vessel at the intervening locations $C_1$, $C_2$, $C_N$. For example, the multiple ray path shown in full corresponding to reflection from the surface at the location $C_2$ can be generated by combining the traces recorded with respect to the source at S and the hydrophone at $C_2$ (which would have been recorded at the same time as the SR trace of interest) and the trace recorded earlier, when the vessel was at $C_2$ and with respect to a differing hydrophone in the streamer, located at that time at R. All possible intervening vessel locations are treated in the same way; that is, combinations of recorded traces are made with respect to numerous reflection locations $C_1$, $C_2$ . . . $C_N$. Thus, for example, the following combinations would be made.

| Traces Recorded With | | | Traces Recorded With | |
|---|---|---|---|---|
| Source At | Hydrophone At | | Source At | Hydrophone At |
| S | $C_1$ | combined with | $C_1$ | R |
| S | $C_2$ | combined with | $C_2$ | R |
| S | $C_3$ | combined with | $C_3$ | R |
| . | . | . | . | . |
| . | . | . | . | . |
| S | $C_N$ | combined with | $C_N$ | R |

In this way, all possible pairs of synthetic multiple traces corresponding to the trace under analysis are generated. These synthetic multiple traces can thus be referred to as traces generated by "gathering" and combining pairs of traces having one end point in common and their other end points being the same as the trace under analysis.

Figure 4:
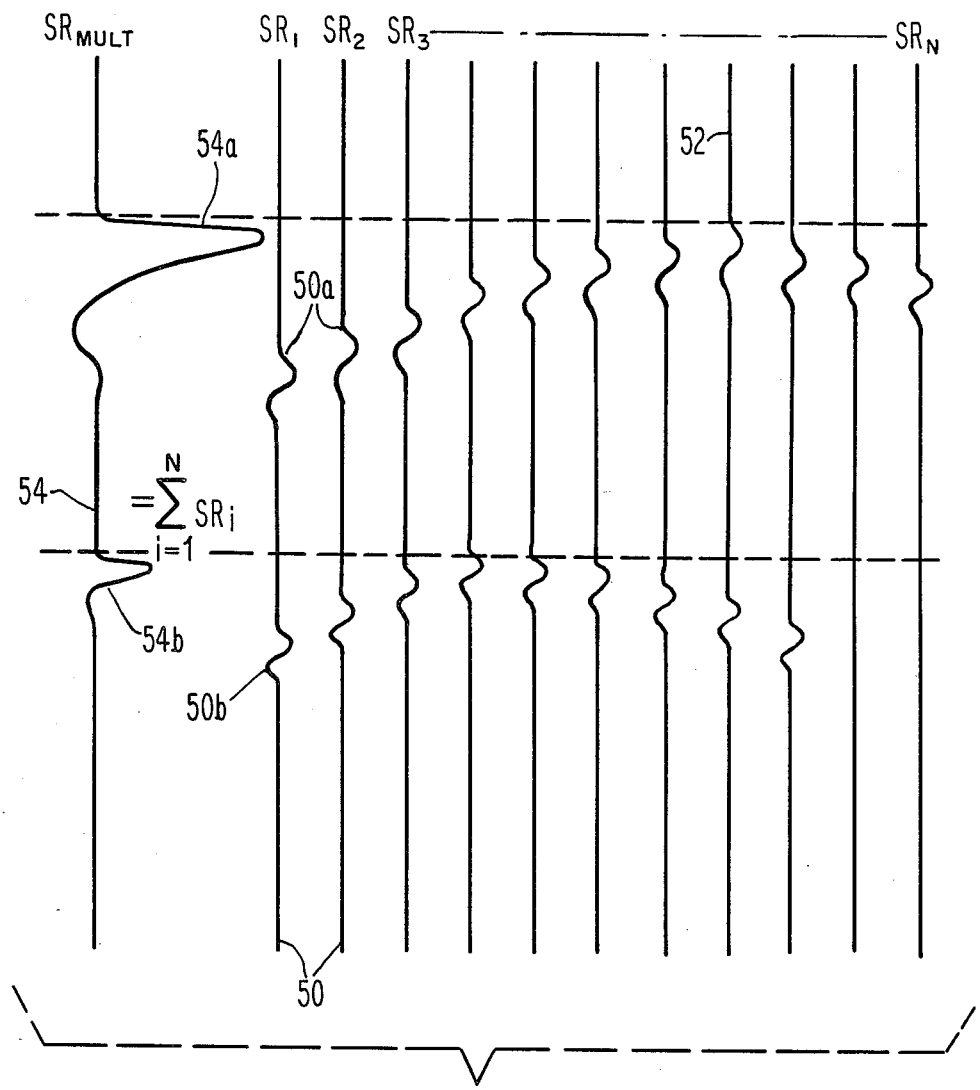

FIG. 4 shows the result of the operation just described.

As discussed above, Huygens' Principle states that of all possible wave paths undergone by a wave traveling in a given medium or media, the ray path which yields the shortest total travel time is that along which the wave actually travels. Accordingly, the actual point C from which the multiple is reflected at the surface, can be located by convolution of the traces between all possible points $C_1$ through $C_N$ and the source and receiver locations S and R, respectively, and noting which has the minimum travel time. However, it is not necessary to do so in order to remove multiples. Instead, "stacking" the convoluted synthetic traces corresponding to waves traveling between S and all possible locations C, and between C and R is performed; the stacked trace is the correct synthetic multiple trace. (The term "stacking" refers to the summing of the instantaneous amplitude values of all the traces, performed with respect to each point in time.) Both procedures are illustrated graphically in FIG. 4 To the right are illustrated a plurality of synthetic multiple traces 50 which are convolved pairs of real traces occurring between various locations C, on the surface, and the locations S and R of the trace 40 of interest. These will be referred to as "synthetic multiple traces" since they are replicas of multiples generated by convolving traces. A plurality of synthetic traces are indicated on the drawing as $SR_1$ through $SR_N$ corresponding to the vessel locations $C_1$-$C_N$ as discussed in connection with FIG. 2A. The "wiggles" or reflections 50a indicate the detection of the multiply-reflected wave. As is illustrated, as the location C varies between S and R some minimum value of the travel time of each reflection event is reached as indicated by trace 52, where the synthetic multiply-reflected wave is received in the shortest time. Examination of the traces 50 can thus reveal the location of point C. However, if the traces are all "stacked", i.e., common points with respect to time are summed, resulting in a stacked trace 54, the minimum time is very clearly indicated by the beginning of the "wiggle" 54a. This is accurately located because even though the time of arrival of the wiggle 50a varies from trace to trace, the relative phase of the wiggles 50a does not, so that the stack of all the traces has a highly correlated initial wiggle 54a. The remainder of the multiples' reflections tend to cancel one another out, as indicated by trace 54. The first wiggle 54a might typically be the first multiple from the ocean bottom. For example, that shown by path SB—BC—C—D—DR in FIG. 2. If a second multiple were notably present, e.g., from path SE—EF—FG—GR this might also show up as a second wiggle at 54b, having been generated by summing over many smaller, similarly correlated wiggles 50b. Unless points C and F are coincidentally the same, different traces 50 will exhibit the shortest travel times, as shown.

The process of "combining" (convolving) two real traces in order to generate a synthetic multiple trace has been referred to generally above. In order to properly combine the traces in order to generate a synthetic multiple trace as described above, it is necessary to do the combining according to a process which will take into account the wave-like nature of the traces. It will be understood by those skilled in the art that one appropriate procedure is convolution. Convolution involves time domain filtering of one function with another. For example, the input seismic waveform is "convolved" by the reflectivity function of the earth in becoming the reflected wave which is recorded to yield the output trace. For general background on the process of filtering which can be expressed by the mathematical operation of convolution, refer to Chapter 2 of "Statistical Theory of Communication" by Y. L. Lee, John Wiley & Sons, Inc., New York, 1961.

Direct evaluation of the convolution of two functions f and g involves evaluation of the integral F defined by the following equation:

$$F(x) = \int_0^x f(t) g(x - t) dt \quad (1)$$

While direct evaluation of this integral is possible using modern computer techniques it is very time consuming. Frequently such evaluation can be simplified by performing an evaluation of such time-domain functions in the frequency domain. This may be done, for example, by taking the Fourier transform of each seismic trace prior to the step of convolution of paired real traces to generate a synthetic multiple trace. According to Fourier analysis, a wave expressed as a function of time, such as a trace, is transformed into a series of values $A_k$, each of which represents the contribution of a particular frequency component to the overall wave. These elements may be characterized by the following equation:

$$A_k = \sum_{i=0}^{N-1} a_i e^{\frac{-j2\pi ik}{N}} \bigg|_{k=0 \text{ to } N-1} \quad (2)$$

where the $a_i$'s are instantaneous values of the wave amplitude.

The convolution of the Fourier-transformed waves can then be simply accomplished by multiplying together the corresponding $A_k$'s for the two transformed traces which are to be convolved to generate a synthetic multiple trace. After the synthetic traces have thus been generated, the inverse Fourier transform operation is applied to them to yield a series of amplitude values (i.e., $a_i$'s) for each of the synthetic traces 50.

The inverse Fourier transform operation is well known and proceeds according to the equation:

$$a_i = \frac{1}{N} \sum_k A_k e^{\frac{-j2\pi ki}{N}} \quad (3)$$

The $a_i$'s can be graphed to yield visual representations of the synthetic multiple traces, as shown at 50. These can be examined to determine which synthetic trace corresponds to the minimum travel time value, such as the trace indicated at 52 of FIG. 4. Alternatively, the corresponding instantaneous amplitude values $a_i$ for the convolved synthetic multiples M can then be algebraicly added to one another to yield the stacked synthetic trace 54. The largest amplitude value will indicate the minimum time of travel of any pair of real waves, and hence of the real multiple. (Alternatively, and preferably for reasons of processing efficiency, stacking can be performed before application of the inverse transformation.) The synthetic trace 54 can be subtracted directly, again $a_i$ by $a_i$, from the trace under analysis 40 after appropriate scaling and filtering operations have been carried out. These will be described in further detail below.

The advantage of carrying out the Fourier analysis is that whereas convolution would have to be performed individually with respect to each pair of traces, Fourier transformation need only be performed once with respect to each trace, followed by simple geometric multiplication of corresponding Fourier transform elements.

FIG. 5 shows a flowchart of the method of the invention. At 60 a trace having end points S and R is selected for analysis. At 62 pairs of traces having one end point in common and their other end points at S or R are convolved with one another. Preferably this process may proceed in the frequency domain, as follows: the Fourier transform of each trace is first calculated at 64. At 65 corresponding frequency components of the Fourier-transformed traces are multiplied together with one another to yield the convolved traces. As indicated at 65, it is to be noted that the traces are selected for this convolution process on the basis of their end points, irrespective of whether the source or the receiver is at the particular end point, as the laws of wave propagation do not vary with respect to direction of travel of the wave. This is referred to as the Reciprocity Principle and results in an effective doubling of the utility of each of the traces recorded in the exploration process. The synthetic traces may then be stacked at 65A. The multiplied and stacked traces then are operated on according to the inverse Fourier transform at 66 to yield the trace having the minimum travel time. Alternatively, the convolved traces could be stacked as at 68 after direct evaluation of the convolution function, but the process described above is computationally more efficient. Similarly, the inverse transform step could precede stacking in the frequency-domain version of the process, but again, the sequence shown is computationally more efficient. It should be noted here that the stacked trace is effectively the synthetic multiple trace with the minimum travel time. In this way, point C, for example, need never e explicitly identified. The operation can be reperformed, as indicated at 72, with respect to higher order multiples, i.e., ones undergoing several reflections from the surface of the water prior to receipt at the detector. In order to do so, the 3, 4 or higher numbers of traces having end points in common and equal to S and R are convolved as above. At 74 the stacked synthetic multiple trace is scaled so that its amplitude corresponds with the amplitude of the trace under analysis. Correlation is performed at 76 to locate the multiple trace with respect to the overall trace being analyzed, i.e., to "line up" the corresponding points on the synthetic multiple trace and the real trace of interest. The synthetic multiple trace can then be subtracted from the real trace.

The scaling, correlation and subtraction processes may comprise design of least-squares filters, at 78, and application of these filters to the synthetic multiple generated as at 80. Filters $f_1$, $f_2$ and $F_3$ minimize the following defined quantity:

$$R(X_r, X_s, t) = f_1(t) * M_1(X_r, X_s, t) - \qquad (4)$$
$$f_2(t) * M_2(X_r, X_s, t) - f_3(t) * M_3(X_r, X_s, t) \ldots$$

where
R = the trace under analysis
$X_r$ = receiver location
$X_s$ = shot location
$M_1$, $M_2$, $M_3$ = first, second, third . . . - order synthetic multiples
* = convolution operator Application of filters then proceeds according to Equation 5:

$$P(X_r, X_s, t) = R(X_r, X_s, t) - f_1(t) * M_1(X_r, X_s, t) \qquad (5)$$
$$f_2(t) * M_2(X_r, X_s, t) \ldots$$

where P = the multiple-free trace. Conventional seismic data processing can then be resumed using P, the multiple-free seismic trace.

It will be appreciated that there has been described a method for removal of surface multiples from seismic records which utilizes the same data as had previously been recorded for seismic exploration so that no complexity is introduced into field operations by implementation of the present invention. Moreover, it will be appreciated that the present invention provides a method for multiple removal which does not require knowledge of the ocean bottom structure or of the structure of the earth beneath the ocean floor, since real traces are used to simulate the multiple portion of a trace under analysis. In this way, the ocean bottom and sea bed structure is implicitly used to generate the synthetic multiple so that the structural information need never be explicitly separated from the seismic record. Moreover, use of Huygens' Principle as the means of selecting the correct synthetic multiple from the myriads of possible multiples contained in the data record provides a highly reliable means of selection of the appropriate multiple.

With respect to a mode of practice of the invention, those skilled in the art will recognize that the method described above and illustrated by FIG. 5 envisions a large amount of data processing operations for every record analyzed. It is envisioned that all records of a given exploration would be so analyzed and accordingly, it would be desirable to carry out the data processing operations as efficiently as possible. It will also be appreciated by those skilled in the art that the same records will be used over and over again in analysis of various traces so as to remove multiples. Accordingly, it may well be that the most efficient mode of practice of the invention will be to generate the Fourier transform representations of each seismic record, store the transformed records, and to select appropriate ones for processing according to the method of the invention as they become members of possible pairs of traces making up a synthetic multiple corresponding to a particular trace under analysis. It will also be appreciated by those skilled in the art that the practice of the invention is amenable to data processing of the type referred to as "parallel processing" for which certain high speed computers are specifically designed. Accordingly, the best mode of practice of the invention is on such a high speed parallel processing digital computer, such as those made by the Cray Research Corporation, or those sold under the "Cyber" tradename by Control Data Corporation.

Accordingly, the above description of the method of the invention should not be considered as a limitation on its scope but only as exemplary thereof. The invention should be measured only by the following claims.

I claim:

1. In seismic exploration wherein a plurality of seismic traces are generated by generating seismic energy at a plurality of points along an exploration line and detecting reflections of said seismic energy at a plurality of said points, a method for removing surface multiple reflections from a trace under analysis comprising the steps of:

generating synthetic surface multiple reflection traces by combining pairs of said traces selected to have an end point in common with one another and to have their other end points in common with the trace under analysis;

identifying from these synthetic traces the synthetic trace having a reflection whose total travel time between the end points of the trace under analysis is minimum; and subtracting the identified synthetic trace from the trace under analysis.

2. The method of claim 1 wherein identification of the synthetic trace having the minimum travel time is performed by stacking the synthetic surface multiple traces generated.

3. The method of claim 1 wherein said combining is performed by convolution of pairs of traces.

4. The method of claim 1 wherein said subtraction step comprises application of at least-squares filter to the identified synthetic trace and the real trace.

5. In seismic exploration wherein a plurality of seismic traces are generated by generating seismic energy at a plurality of points along an exploration line and detecting reflections of said seismic energy at a plurality of said points, a method of removing multiple reflection events from a seismic trace under analysis comprising the steps of:
generating synthetic records of multiple reflection events by summing pairs of said traces, each of said pairs having end points in common with one another and with said trace under analysis, said summing step including the step of convolving said paired traces with one another to generate synthetic traces of multiple reflection events;
selecting from the synthetic records the synthetic trace which has the reflection with the minimum total travel time between the end points of the trace under analysis;
correlating said trace having the minimum travel time between the end points of the trace under analysis with the trace under analysis; and
subtracting it therefrom, to yield a trace having had its multiple reflection events removed.

6. The method of claim 5 wherein said selection step is performed by stacking all generated synthetic traces of multiple reflection events and said subtraction step comprises subtraction of the result of said stacking step from said real trace under analysis.

7. The method of either of claim 5 or 6 wherein said correlation and subtraction steps comprise application of a least-squares filter to the trace having the minimum travel time and the trace under analysis.

8. In seismic exploration wherein a plurality of seismic traces are generated by generating seismic energy at a plurality of points along an exploration line and detecting reflections of said seismic energy at a plurality of said points, a method of removing multiple reflection events from a seismic trace to be analyzed having end points at S and R along an exploration line comprising the steps of:
selecting pairs of said traces, one of each of said pairs having an end point at S and the other of each of said pairs having an end point at R, said paired traces having their other end points at a common surface point along said exploration line;
convolving together said selected pairs to generate synthetic multiple traces;
from these, identifying the synthetic multiple trace having the reflection with the shortest total travel time between said points S and R; and
subtracting said selected synthetic multiple trace having the shortest total travel time from said trace to be analyzed to remove said multiple reflection events from said trace to be analyzed.

9. The method of claim 8 wherein the synthetic multiple trace having the shortest total travel time is identified by stacking said convolved pairs of real traces and the resulting stacked trace is subtracted from the trace under analysis.

10. The method of either of claim 8 or 0 wherein said subtraction step is performed by application of a least-squares filter to the synthetic trace having the shortest travel time and the trace to be analyzed.

11. In seismic exploration wherein a plurality of seismic traces are generated by generating seismic energy at a plurality of points along an exploration line and detecting reflections of said seismic energy at a plurality of said points, a method of removing multiple reflection events from a seismic trace under analysis comprising the steps of:
generating Fourier transform representation of said traces recorded with respect to wave sources and receivers along the line of exploration of said trace to be analyzed;
selecting pairs of said Fourier-transformed traces, both of each pair of traces having an end in common with said trace under analysis and having their other end points in common with one another;
multiplying together common frequency components of said selected Fourier-transformed traces having end points in common with said trace under analysis;
applying the inverse Fourier transform to the multiplied components to generate synthetic multiple traces;
identifying a synthetic multiple trace with a reflection having the minimum net travel time between the end points of the trace under analysis as equivalent to the multiple reflection events in the trace under analysis; and
subtracting the synthetic trace thus identified from the trace under analysis.

12. The method of claim 11 wherein the synthetic multiple trace having the minimum net travel time is identified by stacking the synthetic traces generated in said multiplying step.

13. The method of claim 11 wherein said subtraction step comprises selection of filter coefficients for a least-squares filter to correlate the identified synthetic multiple trace with the trace under analysis, and application of the filter coefficients thus selected to the synthetic multiple trace thus identified and the trace under analysis.

14. In seismic exploration wherein a plurality of seismic traces are generated by generating seismic energy at a plurality of points along an exploration line and detecting reflections of said seismic energy at a plurality of said points, a method of removing records of multiple reflection events from seismic traces representing waves of seismic energy travelling along paths having end points along said exploration line, comprising the steps of:
recording traces with respect to locations of sources and detectors of seismic energy along said line;
calculating Fourier-transformed versions of said traces;
selecting a trace to be analyzed;
selecting pairs of transformed versions of traces, the ones of said pairs of traces each having one end point in common and their other end points the same as the trace to be analyzed;
multiplying together corresponding frequency components of ones of said pairs;
stacking the results of said multiplying step to generate a synthetic multiple trace;
taking the inverse Fourier transform of the synthetic multiple trace; and
subtracting the inversely-transformed synthetic multiple trace from the trace to be analyzed.

15. The process of claim 14 wherein said subtraction step comprises application of a least-squares filter to the synthetic multiple trace and to the trace to be analyzed.

* * * * *